US012043025B2

(12) United States Patent
Maya Agudo et al.

(10) Patent No.: US 12,043,025 B2
(45) Date of Patent: Jul. 23, 2024

(54) PRINT APPARATUS

(71) Applicant: HEWLETT-PACKARD DEVELOPMENT COMPANY, L.P., Spring, TX (US)

(72) Inventors: Isidoro Maya Agudo, Sant Cugat del Valles (ES); Marcel Llorach To, Sant Cugat del Valles (ES); Eduardo Martin Orue, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/639,633

(22) PCT Filed: Oct. 7, 2019

(86) PCT No.: PCT/US2019/054987
§ 371 (c)(1),
(2) Date: Mar. 2, 2022

(87) PCT Pub. No.: WO2021/071465
PCT Pub. Date: Apr. 15, 2021

(65) Prior Publication Data
US 2022/0288951 A1 Sep. 15, 2022

(51) Int. Cl.
*B41J 11/00* (2006.01)
*B41J 11/06* (2006.01)
*B65H 5/22* (2006.01)

(52) U.S. Cl.
CPC ............ *B41J 11/0085* (2013.01); *B41J 11/06* (2013.01); *B65H 5/224* (2013.01); *B65H 2406/31* (2013.01); *B65H 2406/3223* (2013.01)

(58) Field of Classification Search
CPC ........ B41J 11/0085; B41J 11/06; B41J 13/08; B65H 5/224; B65H 2406/31;
(Continued)

(56) References Cited

U.S. PATENT DOCUMENTS 4,931,826 A 6/1990 Lucht
6,409,332 B1 6/2002 Yraceburu
(Continued)

FOREIGN PATENT DOCUMENTS

CN 1438940 A 8/2003
CN 1517209 A 8/2004
(Continued)

OTHER PUBLICATIONS

Masaaki, Tsuji, Ink-Jet Printer, Dec. 20, 2006, China, All Pages (Year: 2006).*
(Continued)

*Primary Examiner* — Justin Seo
*Assistant Examiner* — Tracey M McMillion
(74) *Attorney, Agent, or Firm* — Jordan IP Law, LLC

(57) ABSTRACT

An apparatus is disclosed comprising a print engine in a print zone. A platen opposes the print engine to support print media. The platen includes a plurality of openings in communication with at least one vacuum source. The platen includes a non-vacuum region, comprising a surface devoid of openings in communication with the at least one vacuum source. The non-vacuum region underlies at least a portion of the print zone.

12 Claims, 5 Drawing Sheets

(58) Field of Classification Search
CPC ...... B65H 2406/3223; B65H 2406/351; B65H 2406/3511; B65H 2801/03
See application file for complete search history.

(56) References Cited

U.S. PATENT DOCUMENTS

| | | | |
|---|---|---|---|
| 6,719,398 | B1 | 4/2004 | McElfresh et al. |
| 6,957,887 | B2 | 10/2005 | Bruhn |
| 6,997,538 | B1 | 2/2006 | Kawamura et al. |
| 2004/0169711 | A1 | 9/2004 | Tsuji et al. |
| 2007/0024647 | A1* | 2/2007 | Cowan .................. B41J 29/393 347/5 |
| 2009/0141070 | A1 | 6/2009 | Yamamoto |
| 2010/0276879 | A1 | 11/2010 | Bober |
| 2011/0242220 | A1* | 10/2011 | Yamagishi ........... B41J 11/0085 347/47 |
| 2012/0218341 | A1 | 8/2012 | Maekawa |
| 2014/0267524 | A1 | 9/2014 | Wanibuchi |
| 2015/0091993 | A1 | 4/2015 | Piatt |
| 2017/0136787 | A1 | 5/2017 | Martin Vidal |

FOREIGN PATENT DOCUMENTS

| | | | |
|---|---|---|---|
| CN | 101444996 | A | 6/2009 |
| CN | 101823373 | A | 9/2010 |
| EP | 1449669 | B1 | 4/2007 |
| GB | 2359520 | A | 8/2001 |
| JP | 2001335183 | A | 12/2001 |
| JP | 2009280321 | A | 12/2009 |
| JP | 2011-224963 | A | 11/2011 |

OTHER PUBLICATIONS

Kawamura, N, With Air Flow Interference Device for Ink-jet Printer, Aug. 3, 2005, China, All Pages (Year: 2005).*

* cited by examiner

PRINT APPARATUS

BACKGROUND

Print apparatus may include vacuum systems for maintaining the flatness of the print media. In particular, such systems may be useful for cut media where there is a risk of edges curling and having negative impact on print image quality.

The airflow in the print zone of a print apparatus may also be influential to image quality since the airflow may directly impact print fluid (for example ink) drop consistency. For good image quality it is desirable to have predictable and consistent drop behavior of both main and satellite ink drops.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
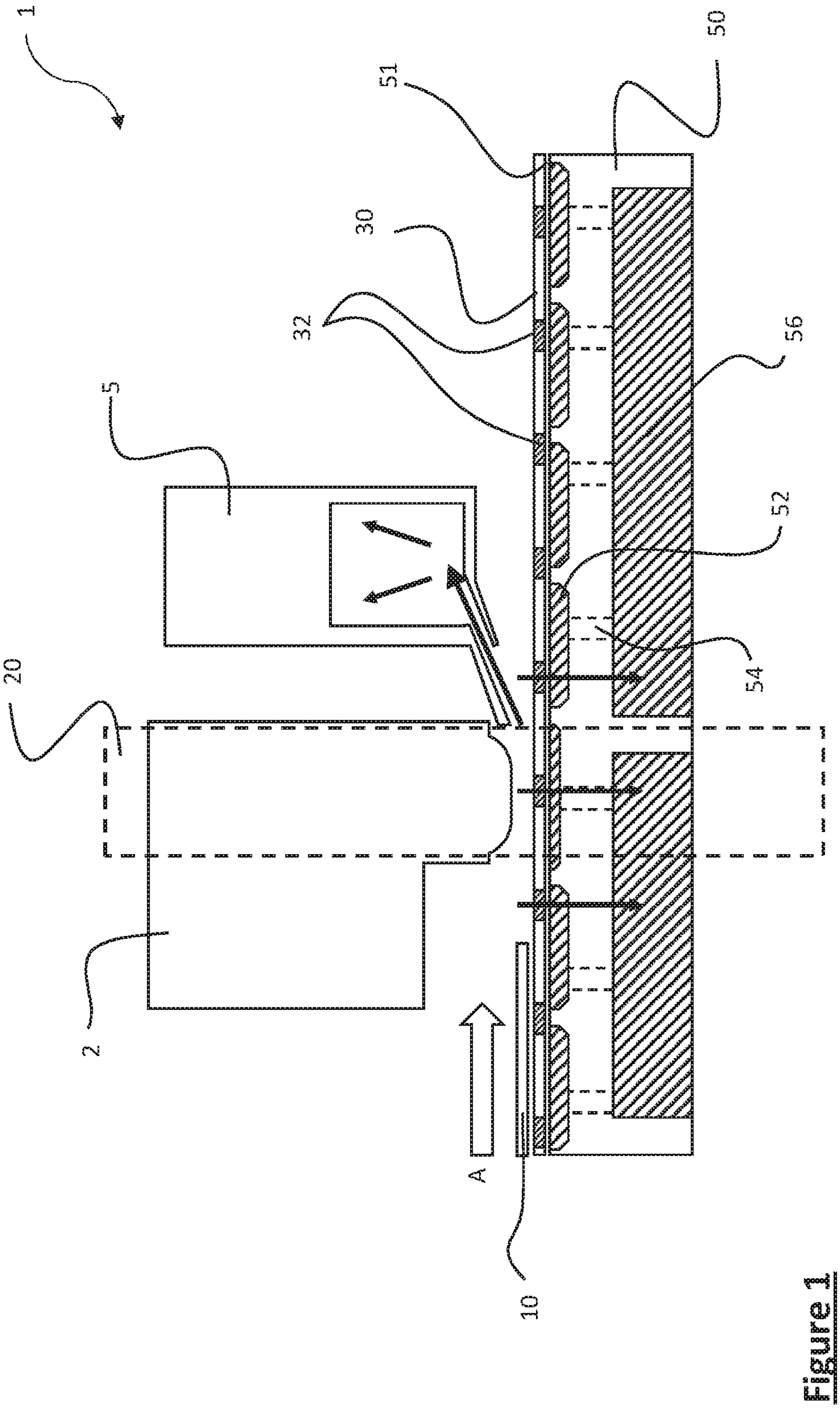
FIG. 1 is a schematic cross section of a print apparatus in accordance with the present disclosure.

A print apparatus 1 in accordance with this disclosure is shown in cross-section in FIG. 1. The print apparatus includes a print engine 2 for printing on print media 10 in a print zone 20. A platen 50 is provided to support the print media 10. The platen 50 opposes the print engine 2 and may extends in a generally parallel spaced apart plane to the head (or heads) of the print engine 2. The platen 50 may, for example, include a conveyor belt 30 for advancing the print media 10. Alternatively, it will be appreciated that rollers or other conveying means may be provided in association with the platen 50. Whilst a single platen 50 and print zone are shown for simplicity in the figures, in some examples an array of such platens may be provided. For example, a plurality of apparatus according to the example may extend across a print apparatus to print across the full width of a print media.

It may be noted that arrow A in the figures shows the feed direction of the apparatus 1. It will be appreciated that references herein to "forward" or "rearward" are intended with reference to the feed direction. In other words, "forward" may be understood to refer parts or surfaces closest to the input end of the apparatus and "rearward" may be understood to refer parts or surfaces closest to the output end of the apparatus.

The platen 50 may be provided with a vacuum system to maintain print media 10 alignment and/or flatness during printing. The vacuum system can include one or more vacuum cavities or chambers 56 within the body of the platen 50 which feed vacuum outlets 52 at the support surface 51 of the platen. The vacuum cavities or chambers may be connected to a vacuum pump (not shown) and can distribute vacuum flow across a plurality of outlets 52. As seen in the cross-section of FIG. 1, the outlets 52 may comprise recesses in the surface 51 of the platen 50. Passageways 54 may extend from the vacuum cavities 56 to the lower surface of each recesses outlet 52 to feed the outlet with vacuum flow. It may be appreciated that the outlets 52 may be arranged in an array, for example a plurality of rows across the surface 51 of the platen 50. The size, shape and configuration of the openings 52 may be optimized for any given print apparatus 1 to provide the desired effect on the print media.

The conveyor belt 30 may be air permeable to allow the pressure from the vacuum opening 52 to be applied to print media on top of the conveyor belt 30. For example, the conveyor belt can be provided with a plurality of regularly spaced apertures 32 which may move across and into alignment with the plurality of vacuum openings 52 of the platen 50. Thus, the apertures 32 may transfer vacuum pressure from the plurality of openings 52 to any print media 10 which is placed on the conveyor belt 32. This may allow the vacuum to hold and flatten the print media 10 as it is advanced relative to the print engine 2.

For image quality reasons it may be useful to provide an airflow system to produce a controlled airflow through the print zone 20. The airflow system may, for example, be an airflow bar suction system 5. The airflow bar 5 extends across the width of the print zone 20 at the outlet side of the print engine 2. The airflow bar 5 provides a suction through the print zone in the media feed direction. The airflow bar 5 may be arranged to provide a generally homogenous air flow across the print zone 20. For example, the airflow system may provide a laminar type flow in the print zone to improve consistency and predictability of print drops. For example, the provision of an airflow system may provide reduced intra-die uniformities in a print engine having multiple print dies and may eliminate defects due to airflow. For example, image quality may benefit from more consistent on media placement of main and satellite ink drops. Inconsistencies in the distance between ink drops (for example as a direct result of unsteady or fluctuating airflow in the print zone) may be perceived by the human eye as different color lightness in the resulting print.

Figure 2A:
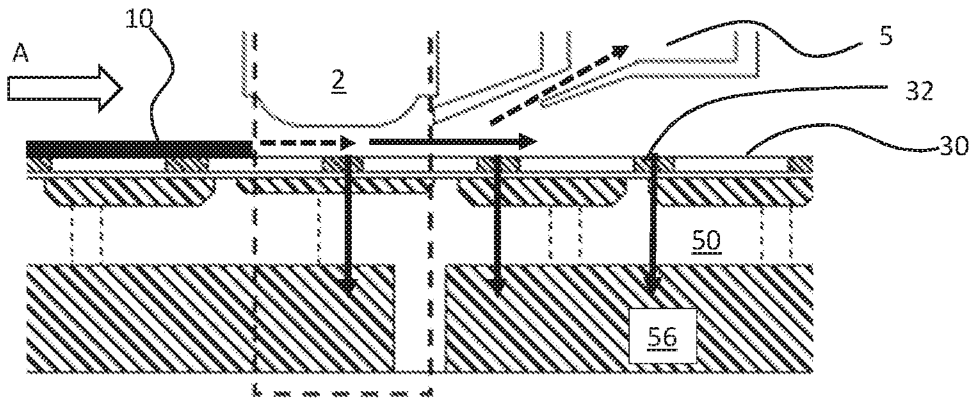
FIGS. 2A, 2B and 2C are sequential cross-sections of the apparatus of FIG. 1 during use.

A potential cause of variation in the airflow during printing may be due to interaction between the flow from the airflow system and the vacuum system, This will be explained further with reference to FIGS. 2 and 3. FIG. 2A through 2C illustrate the transition as the leading edge of print media 10 is introduced into the print zone 20. The print media 10 is carried on the conveyor belt 30 and advances from the left-hand side of FIG. 2. In the initial position of FIG. 2A the leading edge of the print media 10 has not entered the print zone and the media is forward of the print zone 20. As such, the vacuum openings within and on the output side of the print zone 20 are uncovered. The uncovered vacuum openings cause a resulting flow through the print zone 20 as shown by the solid arrows in FIG. 2A. The airflow is in the same direction as the flow from the airflow bar 5, as shown by the broken arrows in the figure.

Figure 2B:
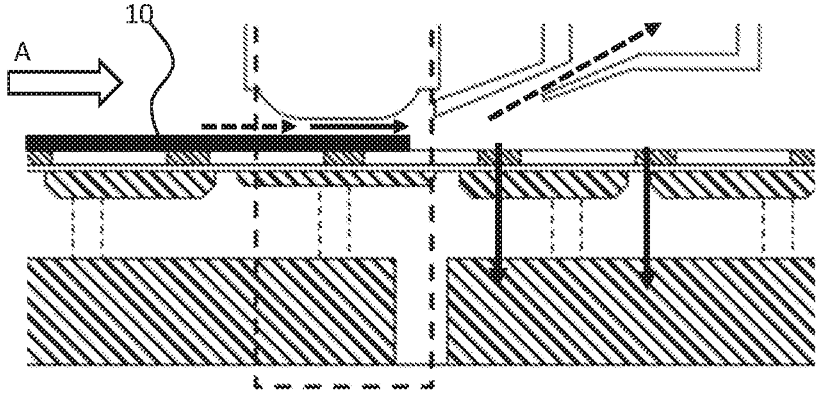
Figure 2C:
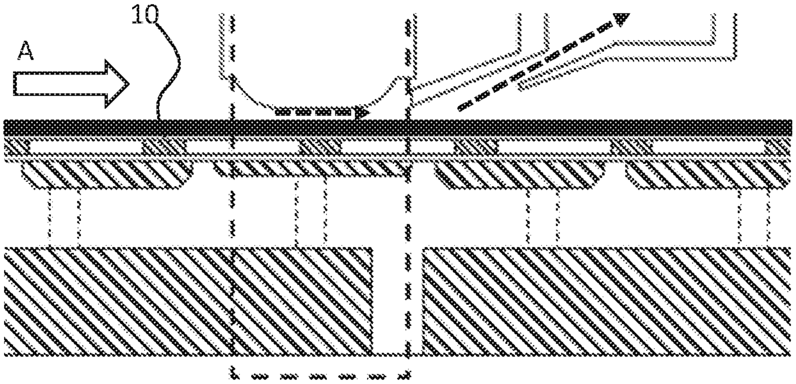

As shown FIG. 2B, when the media 10 advances in the feed direction (indicated by arrow A) the portion of the vacuum outlets covered by the print media 10 increases. As a result, there is a decrease in the influence of the vacuum system on the print zone airflow as illustrated by the reduced size of the solid arrow in FIG. 2B. Thus, the airflow speed through the print zone 20 decreases as the leading edge of the print media 10 moves into and through the print zone 20. As shown in FIG. 2C, once the leading edge has passed the print zone (and is sufficiently forward thereof) the vacuum no longer impacts the airflow in the print zone 20.

The speed transition developed in the airflow through the print zone 20 as the leading edge of the print media 10 enters the print zone may cause color gradients in leading edge portions of the resulting print. When the print engine comprises a plurality of print dies the position of each die in the feed direction may be different (for example, the print engine may include a plurality of dies arranged in two or more rows extending perpendicular to the feed direction each row being spaced apart in the feed direction). As a result of these different positions the color gradient for each die may not be the same since the air speed effects at each location will be distinct. This may lead to variations across the print media which are more perceptible to the human eye.

Figure 3:
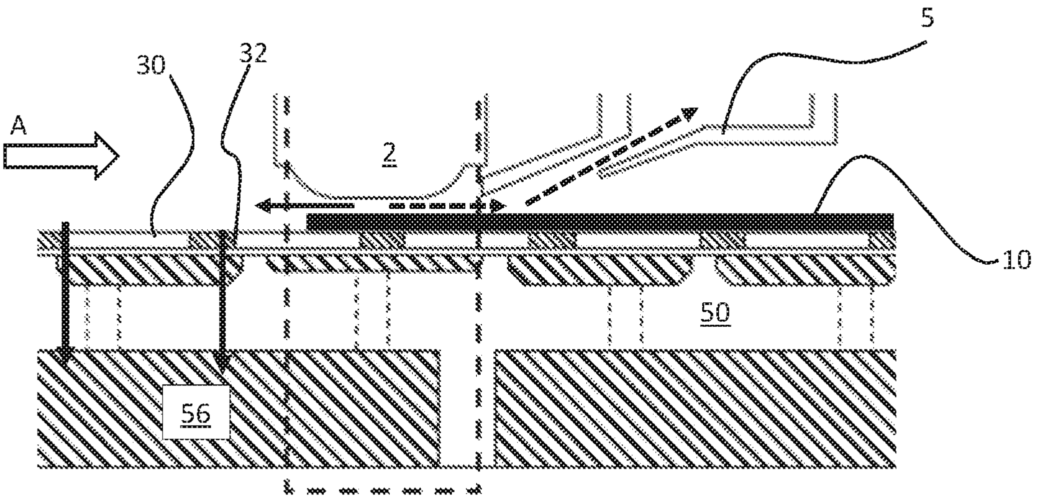
FIG. 3 illustrates a trailing edge transition.
Figure 4:
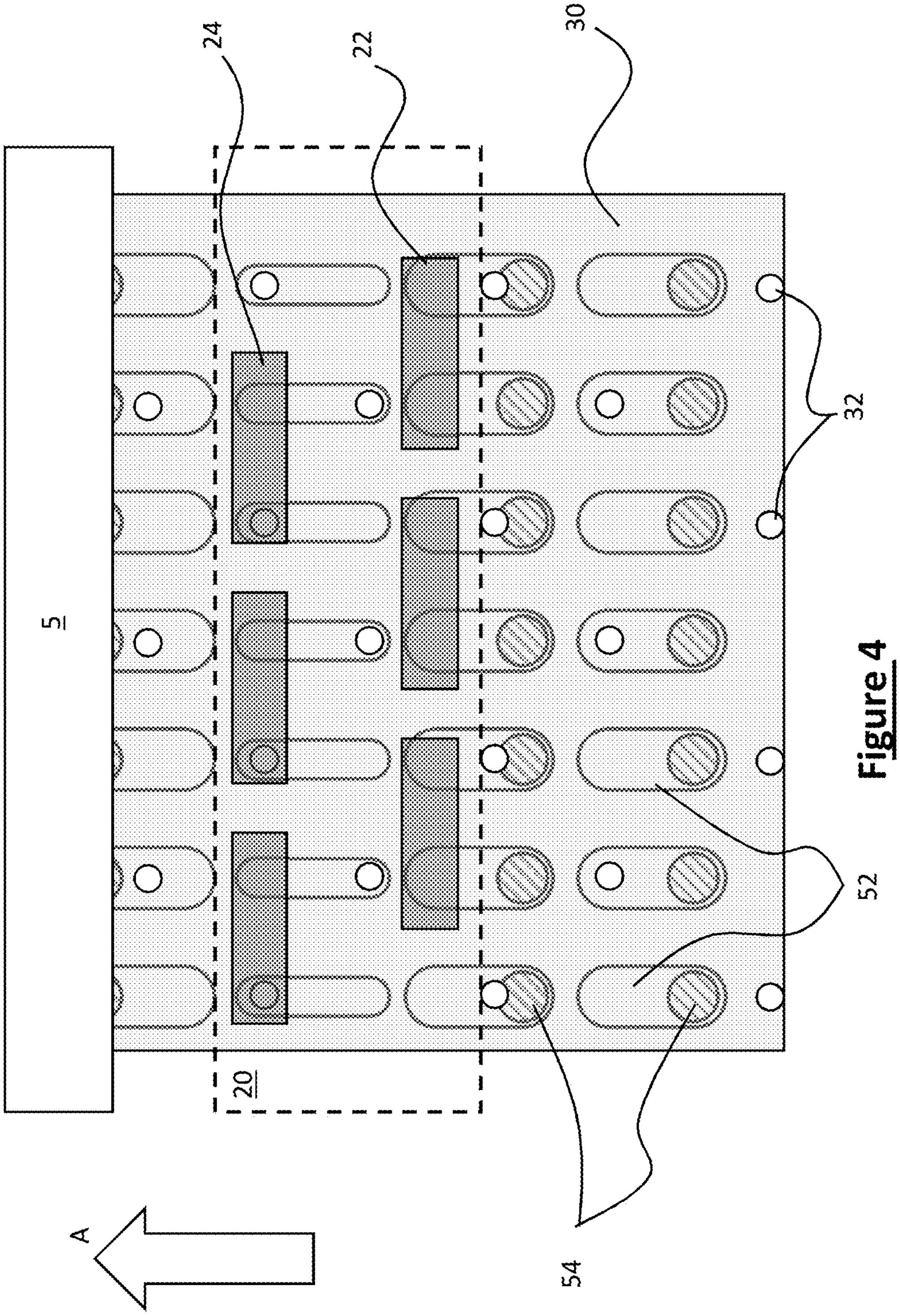
FIG. 4 is a schematic top view of an apparatus in accordance with the present disclosure.

The trailing edge transition is represented in FIG. 3. As the print media 10 moves forward vacuum openings 32 rearward to the print zone 20 become uncovered, This may results in an airflow shown by the solid arrow which is counter to the flow, shown by the broken arrows, provided by the airflow bar 5. The vacuum flow may for example cause the airflow in the print zone to become turbulent. Trailing edge disruptions may result in image defects referred to as "aeroworms" in the print. Aeroworms are wavy horizontal bands in the print which can in some cases give the image a woodgrain type appearance. FIG. 4 includes the conveyor belt 30 (shown as semi-transparent for clarity) whereas the conveyor is omitted from FIG. 5. It can be seen in FIG. 4 that the conveyor belt 30 has a series of regularly spaced apertures 32 which may be arranged in rows across the width of the platen and can be spaced to be positioned over the vacuum outlets 54 of the platen. In the illustrated example, each widthwise row includes an aperture 32 aligned with every other outlet 54 and each row is offset from the previous row to expose a different line of outlets 54. It will be appreciated that the layout of the apertures may be varied as part of the design process dependent upon various factors including, for example, the vacuum flow level or the size of the platen or type of print media.

Figure 5:
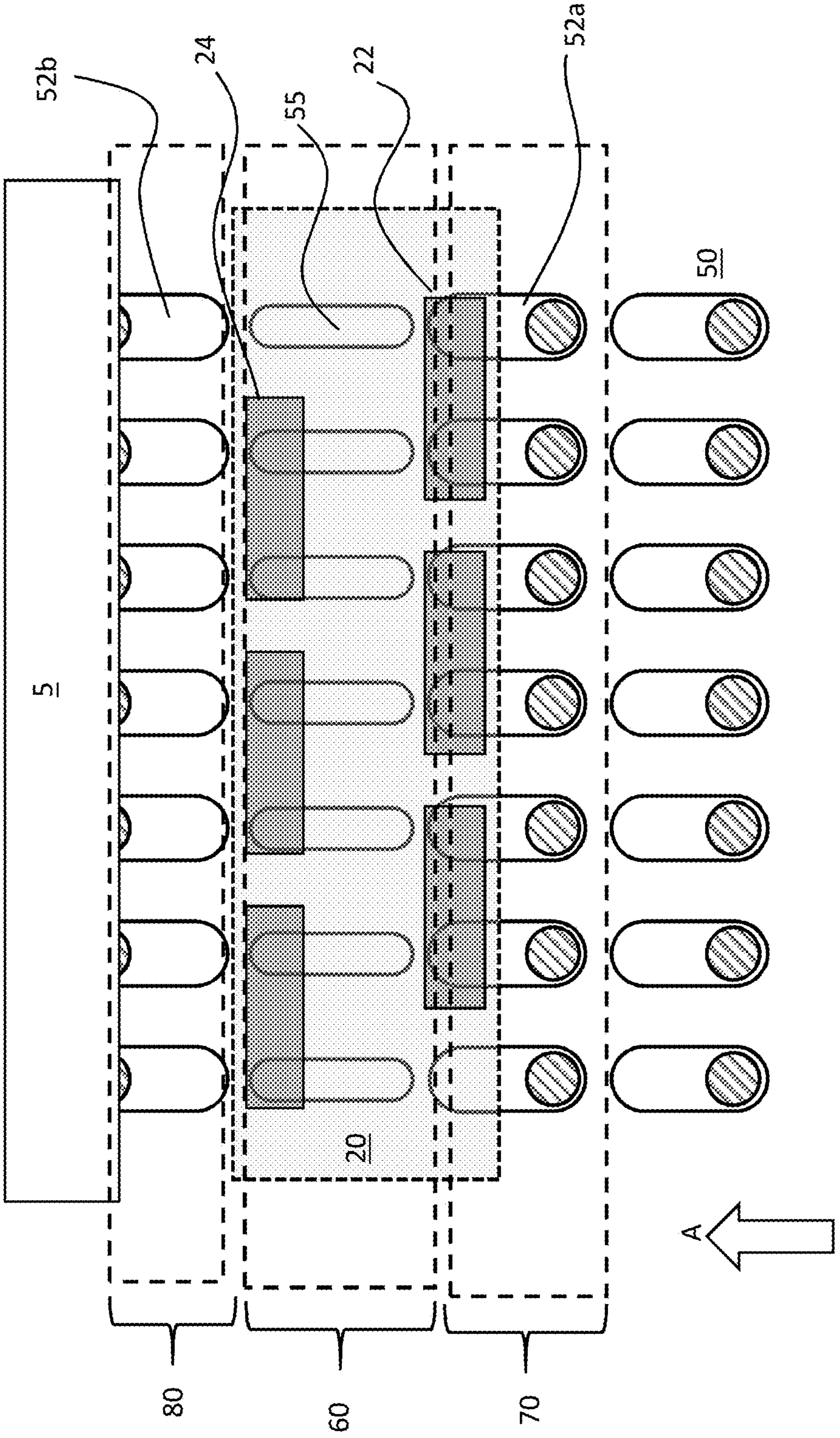
FIG. 5 is a schematic top-view of the apparatus of FIG. 4 with the conveyor belt excluded for clarity.

The print zone 20 may overlie the platen 50 and conveyor belt 30. In the disclosed example the print engine 2 is of a type having a fixed print head comprising a plurality of discreet and fixed positioned print dies. Such an arrangement may for example be used in a printer which is arranged to provide full width printing on the print media. The print dies are arranged in a forward row 22, which is closest to the media input, and a rear row 24, which is closest to the media output. Each row 22, 24 is formed of an array of dies which are spaced across the width of the print zone. In the example of FIGS. 4 and 5 the array of dies in the two rows 22, 24 are laterally staggered but it will be appreciated that other configurations may be possible. The airflow bar of the airflow system 5 is positioned at the outlet side of the print zone 20.

It may be noted that a central portion of the platen in FIGS. 4 and 5 does not have passageways 54 connected to the vacuum system. This central portion is aligned with and extends at least partially through the print zone 20. The central portion may still include surface recesses 55 but these are not vacuum outlets. The provision of recesses is useful even in the absence of vacuum outlets for example it may reducing or avoiding static electricity build up in the print media and may allow the print media to expand due to ink absorption without wrinkling of the media. As shown in FIG. 5, the area of the platen without vacuum outlets provides a non-vacuum region 60 bounded by box marked on the figure. The non-vacuum region 60 may extend across the full width of the print zone 20 (and may therefore extend the full width of the print head).

The position of the non-vacuum region 60 relative to the print zone 20 and the print head dies 22 and 24 may be optimized and will be explained in further detail. The positioning of the non-vacuum region seeks to meet conflicting requirements of reducing interference between the vacuum flow and the flow through the print zone without compromising the flatness of the media leading or trailing edges provided by the vacuum system.

As shown in the example, the non-vacuum region 60 may start (in the feed direction) at the rearmost portion of the first row of die 22 and the non-vacuum region may end at the rearmost portion of the last row of die 24. The region immediately ahead of the non-vacuum region 60 is marked by box 70, this is the region which may be considered to immediately feed the print zone 20. It may be noted that in the example the row of openings **52*a* in this region extend into the print region and overlap the forward row 22 of print dies. The region immediately behind the non-vacuum region 60 is marked by box 80, this is the region which may be considered to be the immediately outlet from the print zone 20. It may be noted that the row of openings 52*b* in the outlet region 80 may commence immediately to the rear of the print zone. The forward most edge of the vacuum outlets 52*b* may for example be aligned with rearmost edge of the rearward row of dies 24**.

As a result of the positioning of the non-vacuum region 60 in the example, the front row of die 22 may commence printing on a leading edge of print media as the media is covering the last vacuum outlets, row **52*a*, before the non-vacuum area. The length of the non-vacuum region 60 may be similar to the leading-edge color gradient and helps avoid issues with the front die. Whilst a similar approach could be applied for the rear row of dice 24 this is less effective as increasing the non-vacuum area further in the feed direction may affect the flatness of the print media. Therefore, as shown in the example of FIG. 5, the row of vacuum outlets 52 may be positioned immediately to the rear of the rear row of dies 24**. As the leading edge of the print media is leaving the outlet side of the print zone the vacuum force may be applied to avoid media lifting.

To ensure that the print media 10 is always subject to some vacuum pressure even when passing through the non-vacuum area 60, the vacuum outlet depressions both before **52*a* and after 52*b* may be provided with a pitch (in the feed direction) matching the pitch of the apertures 32 in the conveyor belt 33. This may ensure that at least one of the apertures 32** of the belt are pressurized whether the leading edge, trailing edge or central portion of the print media is in the print zone.

Whilst the vacuum sinks **52*b* after the non-vacuum area 60 may generate image quality defects at the leading edge it should be noted that examples in accordance with this disclosure may ensure that such defects are consistent within each die of the print engine. It may be appreciated that by ensuring the vacuum along the print bar 5** is generally homogenous the defect within each die may be consistent and homogenous. Such defects may be corrected by calibration.

To address the trailing edge "aeroworm" image defects the example of the present disclosure reduces the flux generated by the uncovered platen in the Media Input area 70 forward of the print zone. The number of vacuum openings in the region may be reduced and the opening number and diameter may be optimized based upon the number of belt apertures to be fed by the vacuum openings.

Optimization of the vacuum openings may also take into account that during usage, media fibers and aerosol particles may be drawn into the vacuum openings. This may create a mass of material that clogs the openings, mnost commonly this may occur in the print zone area. In the example of the present disclosure, the vacuum opening size may be increased in the areas most vulnerable to blockage. The opening size may be unmodified in the input area 70 where such blocking is expected to be less severe. Such modifications may both reduce flux in the airflow to reduce or avoid aeroworm defects and may also improving the service life of the platen.

In the described example, the vacuum impedance in the media input area 70 may be reduced. This may mean that the vacuum applied to the trailing edge of the print media 10 is also higher. This may assist in flattening the trailing edge of flexible media to reduce curling and assist rigid media supportability, where vacuum force may need to be higher to avoid media slippage or lifting.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. An apparatus comprising:

a print engine in a print zone; and a platen opposing the print engine to support print media, the platen including a plurality of openings in communication with at least one vacuum source; wherein the platen includes a non-vacuum region, comprising a surface devoid of openings in communication with the at least one vacuum source, the non-vacuum region underlying at least a portion of the print zone, wherein the print engine comprises a print head having an array of print dies, a row of dies being formed of the array of print dies, wherein the non-vacuum zone extends from a rearward edge of a forward row of dies to a rearward edge of a rearward row of dies.

2. An apparatus as claimed in claim 1, wherein the non-vacuum region extends the full width of the print zone.

3. An apparatus as claimed in claim 1, wherein the print head has a length in a print feed direction and a width perpendicular to the print feed direction and wherein the non-vacuum region extends the full width of the print head.

4. An apparatus as claimed in claim 1, wherein a plurality of rows of print dies of the print head are spaced apart in the print feed direction.

5. An apparatus as claimed in claim 4, wherein the non-vacuum zone extends in the print feed direction from a forward edge to a rearward edge and wherein the forward edge is not forward of the row of dies proximal to an input side of the print zone.

6. An apparatus as claimed in claim 5, wherein the forward edge of the non-vacuum zone is aligned with the rearward edge of the row of dies proximal to the input side of the print zone.

7. An apparatus as claimed in claim 4, wherein the non-vacuum zone extends in the print feed direction from a forward edge to a rearward edge and wherein the rearward edge is not forward of the row of dies proximal to an output side of the print zone.

8. An apparatus as claimed in claim 7, wherein the rearward edge of the non-vacuum zone is aligned with the rearward edge of the row of dies proximal to the output side of the print zone.

9. An apparatus as claimed in claim 1, wherein the apparatus comprises a conveyor belt extending along the platen to move print media relative to the print zone, the conveyor belt having a plurality of apertures to transfer vacuum pressure from the plurality of openings to print media on the conveyor belt.

10. An apparatus as claimed in claim 1, further comprising an airflow system to provide a flow of air across the print zone.

11. An apparatus as claimed in claim 10, wherein the airflow system is provided at an output side of the print engine to provides suction through the print zone in the feed direction.

12. A printer comprising:

a print engine in a print zone;

a platen opposing the print engine to support print media, the platen including a plurality of openings in communication with at least one vacuum source; and an airflow system to provide a flow of air through the print zone between the platen and the print engine; wherein the platen includes a non-vacuum region, comprising a surface devoid of openings in communication with the at least one vacuum source, the non-vacuum region being within the print zone to reduce local interaction between the vacuum and the flow of air from the airflow system, wherein the print engine comprises a print head having an array of print dies, a row of dies being formed of the array of print dies, and wherein the non-vacuum zone extends from a rearward edge of a forward row of dies to a rearward edge of a rearward row of dies.

* * * * *